United States Patent
McQuade et al.

(10) Patent No.: US 7,916,010 B2
(45) Date of Patent: Mar. 29, 2011

(54) METHOD AND SYSTEM FOR ASSOCIATING A TIRE PRESSURE SENSOR TO A WHEEL LOCATION IN AN INTITIATOR BASED TIRE PRESSURE MONITORING SYSTEM

(75) Inventors: Thomas Michael McQuade, Ann Arbor, MI (US); Dilip B. Patel, Novi, MI (US)

(73) Assignee: Ford Global Technologies, Dearborn, MI (US)

(*) Notice: Subject to any disclaimer, the term of this patent is extended or adjusted under 35 U.S.C. 154(b) by 343 days.

(21) Appl. No.: 12/333,399

(22) Filed: Dec. 12, 2008

(65) Prior Publication Data
US 2010/0148949 A1 Jun. 17, 2010

(51) Int. Cl.
*B60C 23/00* (2006.01)
(52) U.S. Cl. .......... 340/442; 340/445; 340/447; 73/146; 73/146.4
(58) Field of Classification Search .......... 340/442, 340/445, 447; 73/146, 146.2, 146.4, 146.5; 116/34 R
See application file for complete search history.

(56) References Cited

U.S. PATENT DOCUMENTS

| | | | |
|---|---|---|---|
| 6,771,169 B1* | 8/2004 | Kaminski et al. | 340/442 |
| 6,952,160 B1* | 10/2005 | Bennie et al. | 340/442 |
| 6,958,685 B2* | 10/2005 | Desai | 340/447 |
| 6,982,636 B1* | 1/2006 | Bennie et al. | 340/442 |
| 7,026,922 B1* | 4/2006 | Talukder et al. | 340/442 |
| 7,369,043 B2* | 5/2008 | McQuade | 340/445 |

* cited by examiner

*Primary Examiner* — Toan N Pham
(74) *Attorney, Agent, or Firm* — Angela M. Brunetti; Fredrick Owens

(57) ABSTRACT

A method and system for eliminating cross talk in a tire pressure monitoring system that ranks potential sensor identifications based on the number of times the sensors respond to an initiator. Upon determination of a sufficient separation between second and third ranked sensors, an assignment of the first and second ranked potential sensor identifications is made to the tire locations expected to respond to the initiator signal.

18 Claims, 4 Drawing Sheets

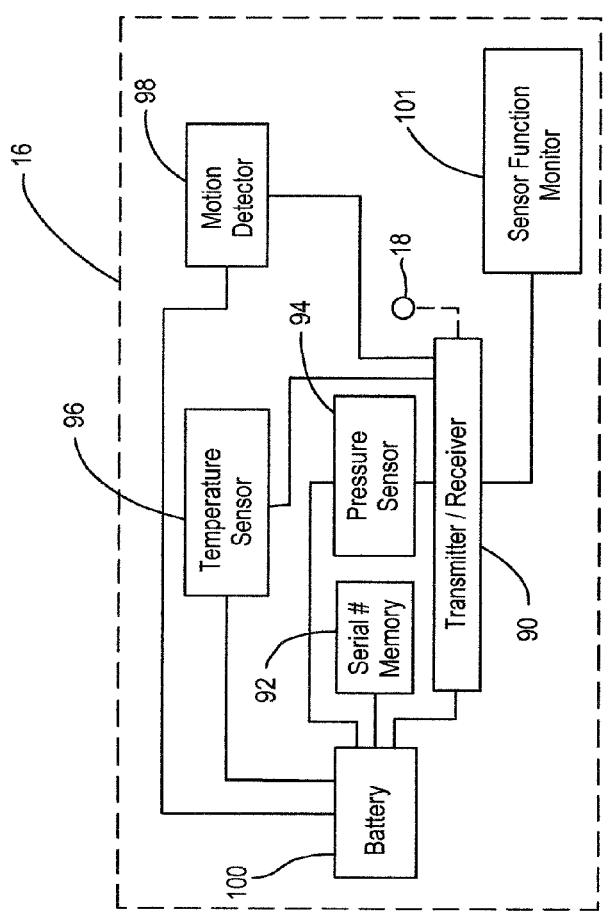

METHOD AND SYSTEM FOR ASSOCIATING A TIRE PRESSURE SENSOR TO A WHEEL LOCATION IN AN INTITIATOR BASED TIRE PRESSURE MONITORING SYSTEM

TECHNICAL FIELD

The inventive subject matter relates generally to an initiator based tire pressure monitoring system in an automotive vehicle and more particularly, to associating a tire pressure sensor with a respective wheel location on the vehicle to a receiver in the vehicle.

BACKGROUND

Various types of pressure sensing systems for monitoring the pressure within the tires of a vehicle generate a pressure signal using an electromagnetic signal, which is transmitted to a receiver. The pressure signal corresponds to the pressure within a tire. When the tire pressure monitoring system detects a low pressure situation, the vehicle operator is directed to remedy the problem. Such problems are remedied by replacing the low tire with a spare tire, or filling the low tire to increase the pressure therein.

Many vehicles are designed as "split placard" vehicles. This means that the vehicles are designed to operate with tire pressures for the front tires that are different than tire pressures for the rear tires. In order to warn a vehicle operator that the tire pressure in a tire is significantly under-inflated relative to the pressure suggested by the OEM, the tire pressure monitoring system (TPMS) must be capable of identifying the tire and associating it with the location of the wheel. This identification and association becomes slightly more complicated when applied to "split placard" vehicles.

In an initiator based TPMS, a controller activates an initiator closest to the wheel location for which a sensor is being identified. The initiator then transmits a low frequency signal to the sensor in the wheel. The sensor detects the low frequency signal and responds by transmitting a signal back to the controller. Ideally, the sensor in closest proximity to the initiator will respond. However, observations of this system have shown that multiple sensors may respond to a single initiator signal. This phenomenon is often called "cross talk". In the event cross talk occurs, the controller has no additional information, or means, to properly select the correct sensor ID to associate to the wheel location.

One method for attempting to eliminate cross talk has been addressed in the initiator. An initiator that is capable of focusing its transmitted energy to a very narrow region has been developed. The narrow region is constrained to include only the expected range of sensor locations for a desired sensor. This solution is not very practical, nor is it cost effective, in that each initiator must be designed for a specific vehicle model and wheel location. For a variety of body styles this would require an initiator design for each body style. Ultimately this solution is not cost effective when applied to mass produced vehicles because it creates the need to have multiple parts to support different body styles.

There is a need to solve the cross talk problem without the need to focus the signal which requires customizing each initiator, adding unwanted cost and complexity to the component.

SUMMARY

The inventive subject matter is a method for associating a tire pressure sensor to a wheel location in an initiator based tire pressure monitoring system according to the independent claims with variations as described in the dependent claims.

DESCRIPTION OF DRAWINGS

A more complete understanding of the present invention may be derived by referring to the detailed description and claims when considered in connection with the following illustrative figures. In the following figures, like reference numbers refer to similar elements and steps throughout the figures.

FIG. 2 is a tire pressure sensor circuit of the inventive subject matter;

FIG. 3 is an example of a sensor data signal that may be transmitted from the transmitter/receiver;

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

In the following figures, the same reference numbers will be used to illustrate the same components. Those skilled in the art will recognize that the various components set forth herein may be changed without varying from the scope of the invention.

Figure 1:
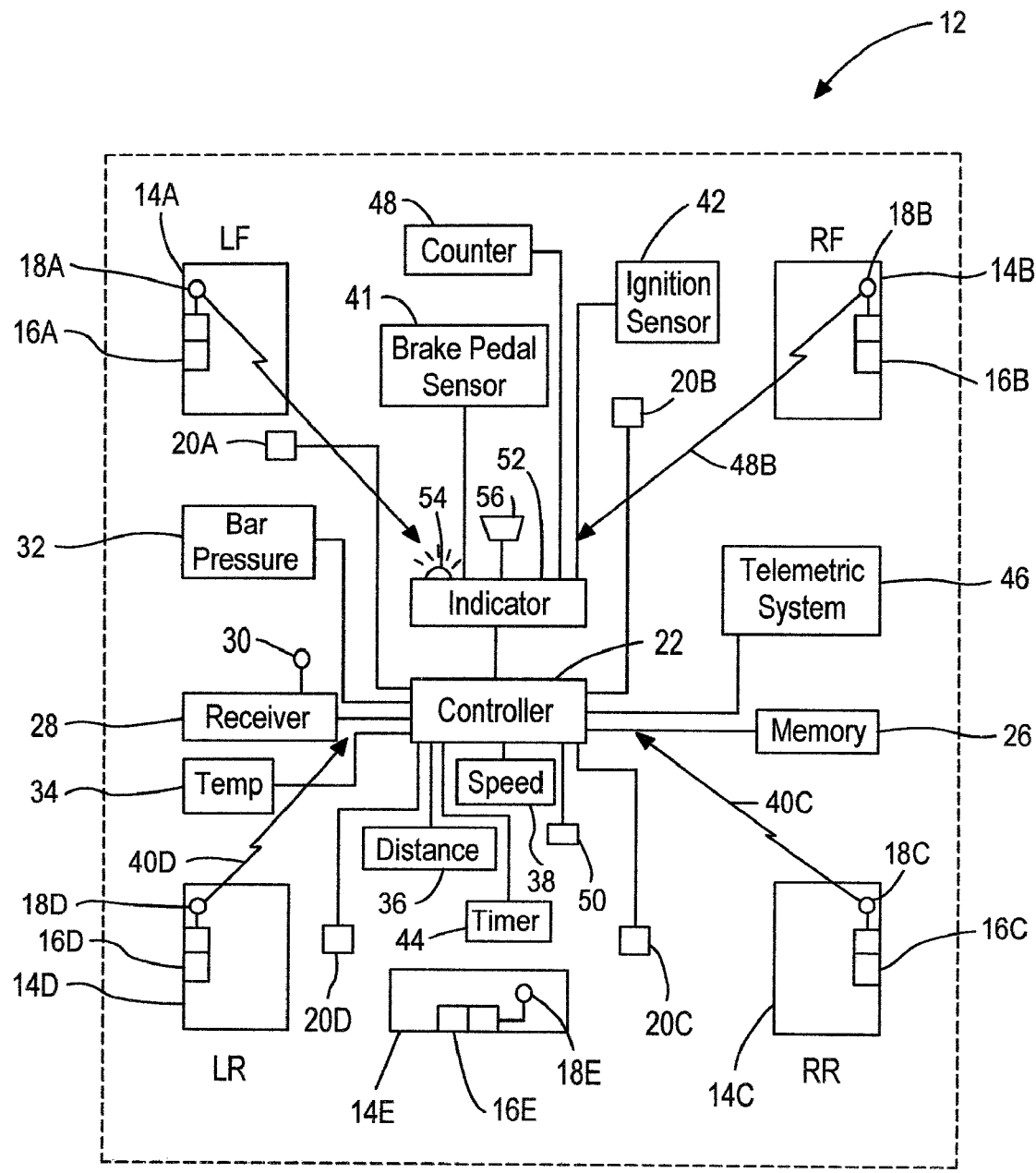
FIG. 1 is a block diagram of a known initiator based tire pressure monitoring system.

An automotive vehicle, not shown, may be equipped with a tire pressure monitoring system 12, as shown in FIG. 1, for monitoring the air pressure within a left front tire 14A, a right front tire 14B, a right rear tire 14C and a left rear tire 14D. Each tire 14A-14D may have a respective tire pressure sensor circuit 16A, 16B, 16C, and 16D. Each sensor circuit 16A-16D has a respective antenna 18A, 18B, 18C and 18D. Each tire is positioned upon a corresponding wheel of a vehicle. Typically, a spare tire 14E is also on the vehicle and may be equipped with a pressure sensor circuit 16E as well as an antenna 18E. While five tires are illustrated herein, it should be noted that the number of tires may be increased as necessary depending on the vehicle. For example, a truck having dual wheels at one or several locations may have more tires than described in the present example.

At least one initiator is positioned among the wheel wells adjacent to the tire 14. In the present example, four initiators are shown. A first initiator 20A may be located at the front left tire, a second initiator 20B may be located at the front right tire, a third initiator 20C may be located at the right rear tire and a fourth initiator 20D may be located at the right rear tire of the vehicle. Initiators 20A-20D, generate a low frequency RF signal initiator and are used to initiate a response from each wheel so that the position of each wheel may be recognized automatically by the pressure monitoring system 12. While four initiators are presented in FIG. 1, it should be noted that a single initiator may be used according to the inventive subject matter and it is not necessary that each wheel have an initiator associated therewith. In alternative embodiments, two initiators, three initiators, or an initiator at each tire location may also be used. Initiators, 20A-20D in the present example, are coupled directly to a controller 22.

Controller 22 has a memory 26 associated therewith. Memory 26 may be various types of memory including but not limited to nonvolatile memory, ROM or RAM. Memory 26 is illustrated as a separate component. However, those skilled in the art will recognize controller 22 may have memory 26 incorporated therein. Memory 26 stores various thresholds, calibrations, tire characteristics, wheel characteristics, serial numbers, conversion factors, temperature probes, spare tire operating parameters, and other values needed in the calculation, calibration and operation of the tire pressure monitoring system 12. For example, memory 26 may contain a pareto that includes the sensor identification and association thereof. Also, any warning status of the tires may be stored within the memory 26.

Controller 22 is coupled to a receiver 28, which, like memory 26, may also be incorporated into the controller 22. Receiver 28 has an antenna 30 associated therewith. Receiver 30 receives pressure and various information from tire pressure circuits 16A-16E. Controller 22 is also coupled to a plurality of sensors, including but not limited to, barometric pressure sensor 32, an ambient temperature sensor 34, a distance sensor 36, a speed sensor 38, a brake pedal sensor 41, and an ignition sensor 42. The variety of sensors generates parameters that may be used, singularly or in any combination thereof, for programming, calibrating, and monitoring in any system, not only in the pressure monitoring system.

A timer 44, which may be inherent in controller 22, may measure various times associated with the process set forth herein. The timer 44, for example, may measure a time after an initiator signal.

A telemetric system 46 may be used to communicate information to and from a central location on a vehicle. For example, the control location may keep track of service intervals and use information to inform the vehicle operator service is required.

A counter 48 may also be used in the tire pressure monitoring system 12. The counter 48 counts the number of times a particular action is performed. For example, counter 48 may be used to count the number of key-off to key-on transitions for the ignition. And, it should be noted, that the counting function may be inherent in controller 22.

Controller 22 may be coupled to a button 50 or plurality of buttons, for inputting information, resetting the controller 22, or various other functions as will be evident to those skilled in the art through the following description. Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator 52 may be an LED or LCD panel used to provide commands to the vehicle operator when manual calibrations are performed.

Referring to FIG. 2, a tire pressure sensor circuit 16 of the inventive subject matter is shown. Although only one tire pressure sensor circuit 16 is shown, each may be commonly configured. A transmitter/receiver, or transceiver 90, is coupled to the antenna 18 and transmits information to the receiver (not shown in FIG. 2). The receiver portion may be used to receive an activation signal for the initiator (also not shown in FIG. 2). The pressure sensor may have a serial number memory 92, a pressure sensor 94 for determining the pressure within the tire, a temperature sensor 96 for determining temperature within the tire, and a motion detector 98 which may be used for activating the pressure sensing system and generating a vehicle speed signal. An initial message is referred to as a "wake" message, meaning the pressure sensing circuit has been activated to send its pressure transmissions and the other data.

The transceiver 90, serial number memory 92, pressure sensor 94, temperature sensor 96 and motion sensor 98 are coupled to a battery 100. Battery 100 is preferably a long-life battery capable of lasting through the life of the tire. A sensor function monitor 101 generates an error signal when various portions of the tire pressure circuit are not operating or are operating incorrectly. Sensor function monitor 101 may also generate a signal indicating the system is operating normally.

Referring now to FIG. 3, an example of a data signal, or word, 102 that may be transmitted from the transmitter/receiver 90 is illustrated. The word 102 may comprise a transmitter identification serial number portion, hereinafter sensor ID, 104 and a data portion in a predetermined format. For example, the data portion may include a pressure 106, a temperature/counter value 108, a sensor status 110 in which a predetermined number of bits, i.e., five, are dedicated to a factory true setting 111, and a check-sum value 112. Motion detector 98 (shown in FIG. 2) may initiate transmission of word 102 to the transceiver 90 (also shown in FIG. 2). The word 102 is preferably configured such that the information may be decoded and validated while providing the identification serial number, the pressure, the temperature and the sensor function.

Figure 4:
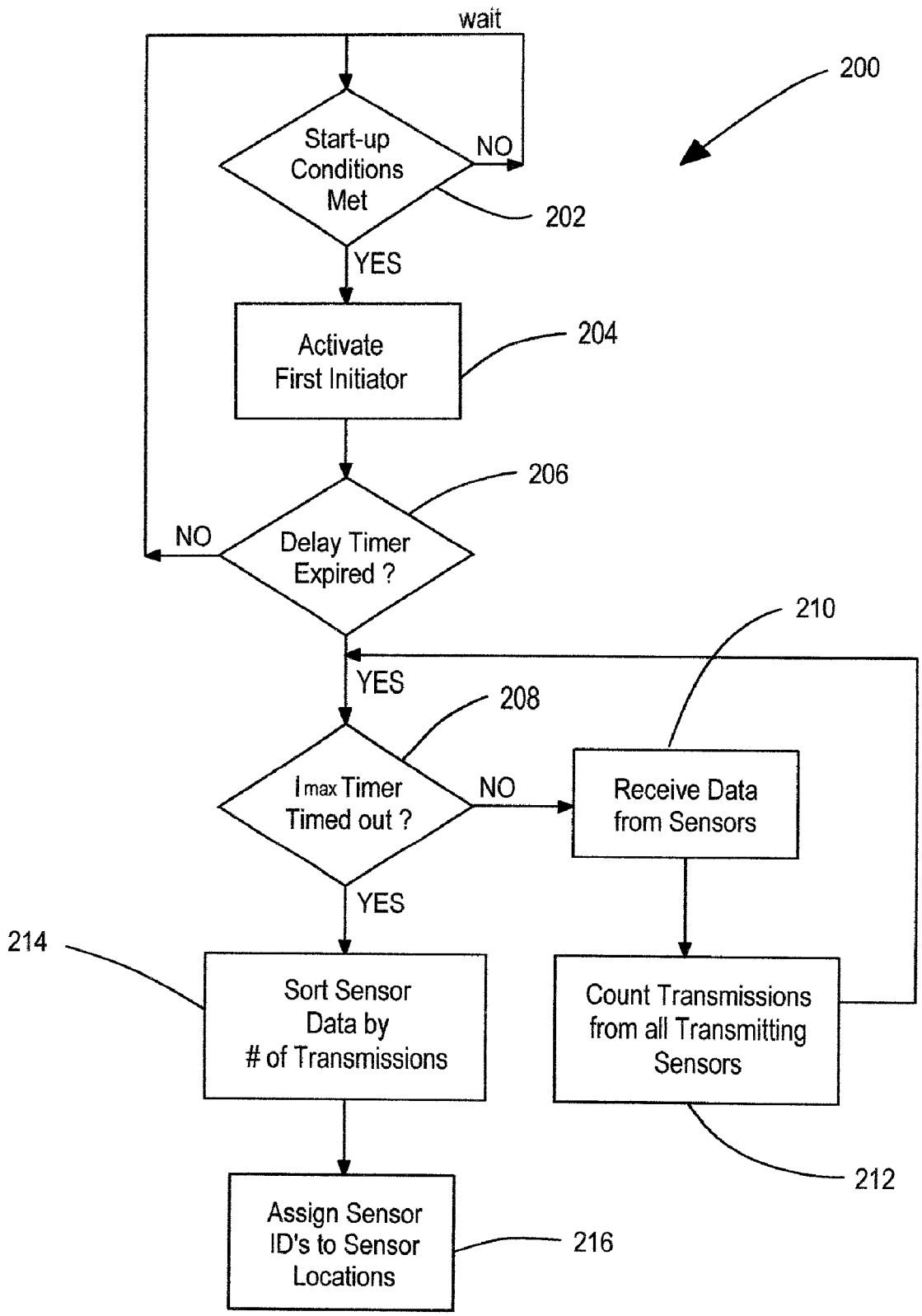
FIG. 4 is a flow diagram of the sensor location assignment method of the inventive subject matter.

According to the inventive subject matter, the sensor ID location process distinguishes between the front or rear location of a particular tire pressure sensor without intervention by a vehicle operator. For a system that uses more than two initiators, the inventive subject matter may identify each tire pressure sensor location on the vehicle. FIG. 4 is a flow diagram of the sensor location assignment method 200 of the inventive subject matter using at least one initiator, preferably located in the rear of the vehicle. While the precise location of a single initiator is not critical to the inventive subject matter, it is preferable to locate the initiator between the wheel sensors. For the purpose of simplicity only, the description of the inventive subject matter is directed to a single initiator that may be located between the rear wheels. For a two-initiator system, the initiators may be located at each wheel in the rear of the vehicle. For a three, four, or more initiator system, where the initiators are located at each tire of the vehicle, an order of association may be established for all four tires and will be described later herein. For example, with at least three initiators, left front, right front, left rear and right rear may be the order in which association takes place.

The at least one initiator, 20D in this present example, is turned on for a predetermined time so that the magnetic field duration is active for a minimum of $I_{min}$ seconds and a maximum of $I_{max}$ seconds. Other parameters used in the method include a predetermined initiator delay timer, and an initiator speed threshold value. Each of these parameters is configurable as applicable to the particular vehicle application.

Upon start-up of the vehicle, until predetermined conditions are met 202, such as an ignition sensor detecting the initiation of the ignition, and the vehicle speed attaining the initiator speed threshold value, the method is idle. When the predetermined conditions are met 202, at least one initiator, such as the initiator associated with the left rear tire, which also may be the only initiator present in the system, is activated 204. The initiator delay timer is started 206. The delay is used to ensure that the vehicle speed has reached the threshold value. Upon the delay timer expiring, the $I_{max}$ timer is started 208, and the method waits 210 for data from the sensors. Sensor transmission data is stored, as in the memory of the controller.

According to the inventive subject matter, the counter counts 212 transmissions, i.e., the number of times a sensor transmits during the predetermined period of time. The sensor data, including sensor ID and number of transmissions, is sorted 214 and ranked in order of the number of transmissions. For example, a potential ID1 will have the highest number of transmissions, followed by a potential ID2, and so on as each sensor responding to the initiator is assigned a potential sensor ID.

In order to identify the sensors with the highest number of transmissions, the method of the inventive subject matter looks to a difference between the number of messages received among the sensor ID's, and particularly to the difference in the number of messages received between the second and third highest ranked sensors. Upon determination that a sufficient, or predetermined, difference exists between the number of times the second ranked sensor transmits in response to the at least one initiator and the number of times the third ranked sensor transmits in response to the at least one initiator, the controller can assign 216 the sensor identifications to the locations expected to respond to the initiator.

It is known that, even in a situation where there is cross-talk among sensors, the targeted sensor will respond much more often than the interfering sensors. For example, the initiator 20D for the left rear sensor is initiating transmission from the left rear sensor circuit 16D. The time elapsed allows the system to make a determination of where each sensor is located on the vehicle. It is possible to take several minutes in order to make a determination of where each sensor is located on the vehicle. Therefore, an example may involve the initiator being turned on three times per minute for five minutes, providing up to 15 instances for a given sensor to respond.

After the predetermined time has elapsed and the controller has ranked the sensor responses, a determination may be made as to which sensor identifications are to be associated with the front wheels and which sensor identifications are to be associated with the rear wheels.

Figure 5:
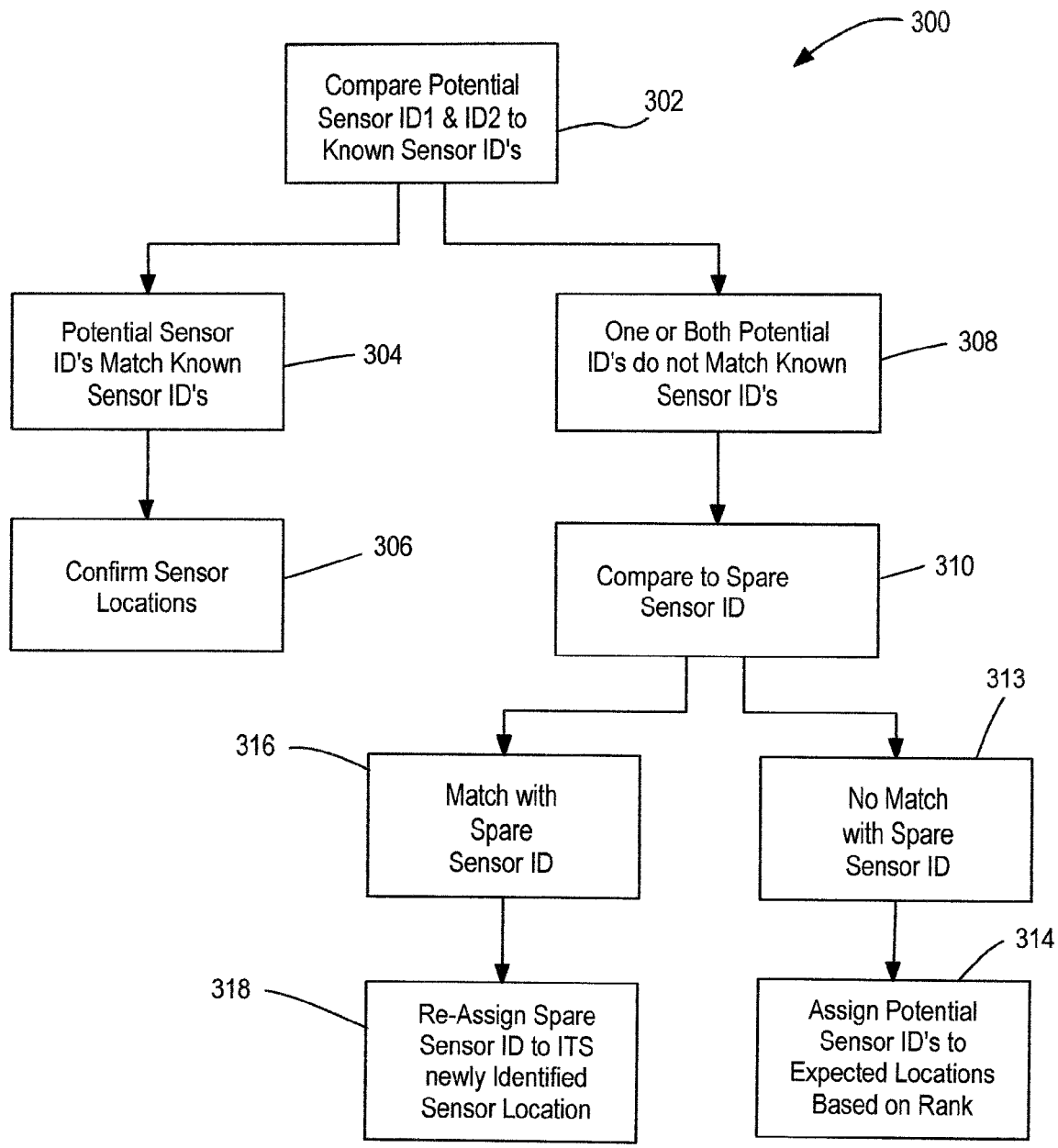
FIG. 5 is a flow diagram of potential sensor identifications as compared to known sensor identifications.

In order to assign the potential sensor identifications to the locations expected to respond to the initiator for a system using a single initiator, the inventive subject matter compares the first and second ranked potential sensor identifications, ID1 and ID2, to sensor identifications that are known to be stored in non-volatile memory. The known sensor identifications are associated with tire locations on the vehicle. Therefore, the inventive subject matter is able to distinguish between sensors at the rear tires, sensors at the front tires, and a spare tire. FIG. 5 is a flow diagram 300 of the possible outcomes that may present themselves in the comparison of the potential sensor ID's according to the inventive subject matter.

The potential sensor ID's, ID1 and ID2, are identified as the top two ranking sensor ID's, given that the difference between the number of transmissions between the second and third ranking sensor ID's is acceptable. Potential sensor ID's, ID1 and ID2, are compared 302 to known sensor identifications stored in non-volatile memory. In the present example, the potential sensor ID's would most likely be expected to match the sensor ID's stored in non-volatile memory for the rear tires, because the at least one initiator 20D is located at the rear of the vehicle. In the event both of the potential ID's match 304 the known sensor ID's for the rear left and rear right tires, confirmation 306 that the sensor ID's are related to the rear wheels has been accomplished.

In the event that at least one of the potential sensor ID's, ID1 or ID2, assigned to the rear left tire and/or the rear right tire are no longer present in either location 308, the sensor ID's are compared to a spare tire sensor ID 310 stored in non-volatile memory in order to determine if the potential sensor ID matches the known spare tire sensor ID.

If none of the potential sensor ID's is matched 312 to the known spare sensor ID, new assignments 314 will be made for the potential sensor ID's based on the rankings. The new assignments are made for the expected location of the sensor having the most transmissions. In the present example, the initiator 20D initiates the rear left tire pressure monitoring circuits. Therefore, potential sensor ID1 and potential sensor ID2 will be assigned to the rear tires as they are the locations expected to have the highest number of responses to the initiator 20D. The newly assigned sensor ID's will be stored in the non-volatile memory. As discussed previously herein, the application of the at least one initiator being associated with the rear tire pressure sensors is for example purposes only and is not intended to limit the application of the inventive subject matter.

Finally, if one or both of the potential sensor ID's does not match the known rear tire sensor ID's stored in memory, but at least one of the potential sensor ID's matches 316 the known spare tire sensor ID stored in memory, then it can be confirmed that the spare tire has been used to replace a tire at a known tire location. The method will re-assign the spare sensor ID to its newly identified location. The newly assigned sensor ID's will be stored in non-volatile memory.

In a system that employs one or two initiators, the inventive subject matter may distinguish between the front and rear tires of the vehicle. In order to assign particular sensor locations to each tire location, the system may use at least three or more initiators. In this example, the inventive subject matter may identify and assign each pressure sensor to its specific tire location by following the method and comparison for each initiator in turn. In this embodiment, each initiator is activated according to the method outlined in FIG. 4 and the comparison outlined in FIG. 5. In this regard, each sensor may be assigned to its specific tire location.

The inventive subject matter is advantageous in that it eliminates the need to exert engineering efforts and added cost to designing an initiator capable of focusing the energy to a specific sensor. The inventive subject matter is also advantageous in that it eliminates the need for different initiator parts for different vehicles and/or different wheel locations on the same vehicle model.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

What is claimed is:

1. A method for identifying a sensor location in an initiator based tire pressure monitoring system, the method comprising the steps of:
    activating at least one initiator directed to at least one sensor in a known tire location;
    counting the number of transmissions sent during a predetermined period of time for each sensor responding to the at least one initiator;
    ranking a plurality of potential sensor identifications based on the number of counted transmissions for each sensor in response to the at least one initiator;
    assigning the potential sensor identification having the highest number of transmissions to the at least one sensor in the known tire location.

2. The method as claimed in claim 1 wherein the step of activating at least one initiator further comprises activating the initiator a predetermined number of times within the predetermined period of time.

3. The method as claimed in claim 1 wherein the step of ranking a plurality of potential sensor identifications further comprises the steps of:
    ranking at least first, second and third potential sensor identifications based on the number of counted transmissions for each sensor in response to the at least one initiator;
    calculating a difference between the number of transmissions of the second ranked sensor and the third ranked potential sensor identifications; and
    comparing the difference to a predetermined threshold value to determine a sufficient separation in the number of transmissions.

4. The method as claimed in claim 3 wherein the step of assigning the potential sensor identifications further comprises the step of assigning the first and second ranked sensor identifications to tire locations expected to respond to the at least one initiator upon confirmation that a sufficient separation in the number of transmissions exists between the second and third ranked potential sensor identifications.

5. The method as claimed in claim 4 wherein the initiator based tire pressure monitoring system has a plurality of initiators and further comprising the step of repeating the method for each initiator thereby assigning the potential sensor identification to their respective tire locations for each tire on the vehicle.

6. The method as claimed in claim 5 wherein the plurality of initiators further comprises at least three initiators.

7. A method for identifying a sensor location in an initiator based tire pressure monitoring system for a vehicle having front right, front left, rear right, rear left tires and a spare tire, the method comprising the steps of:
    activating at least one initiator directed to pressure sensors in predetermined tire locations;
    counting the number of transmissions sent in a predetermined period of time for each pressure sensor responding to the at least one initiator;
    establishing a potential sensor identification for each pressure sensor responding to the at least one initiator;
    ranking the potential sensor identifications based on the number of counted transmissions for at least first, second and third ranked potential sensor identifications, the potential sensor identifications being ranked based on the number of transmissions counted for each pressure sensor responding to the at least one initiator;
    assigning the first and second ranked potential sensor identifications to the locations associated with the predetermined tire locations.

8. The method as claimed in claim 7 wherein the step of activating at least one initiator further comprises activating the initiator a predetermined number of times within the predetermined period of time.

9. The method as claimed in claim 7 wherein the step of ranking the potential sensor identifications further comprises the steps of:
    calculating a difference between the number of transmissions of a second ranked sensor and a third ranked sensor;
    comparing the difference to a predetermined threshold value to determine a sufficient separation in the number of transmissions; and
    assigning the potential sensor identifications upon determination that a sufficient separation in the number of transmissions exists.

10. The method as claimed in claim 7 wherein the step of assigning the potential sensor identifications further comprises:
    comparing the potential sensor identifications having the first and second rankings to known sensor identifications associated with the predetermined tire locations stored in non-volatile memory;
    identifying any match between potential sensor identifications and known sensor identifications; and
    confirming the potential sensor identifications that match known sensor identifications for the tires as being associated with their respective tire locations.

11. The method as claimed in claim 10 wherein the step of identifying any match further comprises:
    identifying any match between potential sensor identifications and known sensor identifications including a spare tire sensor identification;
    assigning the spare tire sensor identification to the newly identified sensor location upon a match between the first and second ranked potential sensor identifications and the known spare tire sensor identification; and
    storing the assigned sensor identifications in non-volatile memory.

12. The method as claimed in claim 11 further comprising the steps of:
    identifying the absence of any match between potential sensor identifications and known sensor identifications; and
    assigning the first and second ranked potential sensor identifications to expected tire locations; and
    storing the assigned sensor identifications in non-volatile memory.

13. The method as claimed in claim 12 wherein the at least one initiator further comprises at least three initiators and further comprising the step of repeating the method for each initiator in order to identify and assign sensor identifications to respective tire locations on the vehicle.

14. A system for eliminating cross-talk among sensors in a tire pressure monitoring system when determining sensor locations in a vehicle, the system comprising:
    a plurality of tire pressure monitoring sensors wherein each sensor is associated with a respective tire location on the vehicle;
    at least one initiator associated with at least one sensor for a tire in a predetermined location on the vehicle, the initiator for initiating a response from at least one sensor associated with the at least one tire;

a control algorithm for assigning a potential sensor identification to a respective tire location on the vehicle, wherein the algorithm counts the number of times each of the plurality of sensors transmits a signal in response to the at least one initiator for a predetermined period of time, creates a ranking of potential sensor identifications according to the number of times each sensor responds to the initiator wherein each ranked sensor is assigned a potential sensor identification, and assigns a respective tire location to each potential sensor identification based on its rank.

15. The system as claimed in claim 14 wherein the control algorithm further comprises:

calculating a difference between the number of transmissions of a second ranked potential sensor identification and a number of transmissions of a third ranked potential sensor identification in response to the at least one initiator; and comparing the difference to a predetermined threshold value to determine a sufficient separation in the number of transmissions exists before assigning the respective tire locations to each of the first and second ranked potential sensor identification.

16. The system as claimed in claim 15 wherein the respective tire locations assigned to the first and second ranked potential sensor identifications are determined to be the tire locations expected to respond to the at least one initiator.

17. The system as claimed in claim 16 wherein the control algorithm further comprises:

comparing the first and second ranked potential sensor identifications to known sensor identifications that are stored in non-volatile memory;

confirming the assignment of respective tire locations when the first and second ranked potential sensor identifications match the stored sensor identifications for the expected respective tire locations;

re-assigning sensor identifications of respective tire locations when either of the first and second ranked potential sensor identifications match a known sensor identification for a spare tire location whereby the spare tire sensor identification is re-assigned to the respective tire location that is expected to respond to the initiator; and re-assigning sensor identifications of respective tire locations when none of the first and second ranked potential sensor identifications match a known sensor identifications whereby the first and second ranked potential sensor identifications are assigned to the respective tire locations that are expected to respond to the initiator.

18. The system as claimed in claim 17 wherein the system further comprises at least three initiators and the control algorithm is applied to each initiator in turn in order to assign potential sensor identifications to respective tire locations for each sensor and each tire on the vehicle.

* * * * *